(12) United States Patent
Ke et al.

(10) Patent No.: US 10,766,210 B2
(45) Date of Patent: Sep. 8, 2020

(54) CUTTER DEVICE FOR AUTOMATED COMPOSITE MATERIAL PLACEMENT EQUIPMENT

(71) Applicant: ZHEJIANG UNIVERSITY, Zhejiang (CN)

(72) Inventors: Zhenzheng Ke, Zhejiang (CN); Yinglin Ke, Zhejiang (CN); Liang Cheng, Zhejiang (CN); Weidong Zhu, Zhejiang (CN); Jiangxiong Li, Zhejiang (CN); Weiwei Qu, Zhejiang (CN); Huiyue Dong, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 16 days.

(21) Appl. No.: 16/197,363

(22) Filed: Nov. 21, 2018

(65) Prior Publication Data
US 2020/0031064 A1     Jan. 30, 2020

(30) Foreign Application Priority Data
Jul. 24, 2018   (CN) .......................... 2018 1 0819279

(51) Int. Cl.
*B29C 70/38*     (2006.01)
*B26D 1/56*     (2006.01)
(Continued)

(52) U.S. Cl.
CPC ............ *B29C 70/382* (2013.01); *B26D 1/565* (2013.01); *B29C 70/384* (2013.01);
(Continued)

(58) Field of Classification Search
CPC . B26D 1/08; B26D 1/085; B26D 1/04; B26D 1/045; B26D 1/06; B26D 1/09; B29C 70/384; B29C 70/382
See application file for complete search history.

(56) References Cited

U.S. PATENT DOCUMENTS

2011/0309543 A1*  12/2011  Beraud ................. B29C 70/384
                                                                    264/140

FOREIGN PATENT DOCUMENTS

CN    103496176 A  *  1/2014
CN    103496177 A  *  1/2014
(Continued)

OTHER PUBLICATIONS

English translation of CN 103496176A. (Year: 2014).*

*Primary Examiner* — Jennifer B Swinney
(74) *Attorney, Agent, or Firm* — JCIPRNET

(57) ABSTRACT

This invention relates to a cutter device for automated composite material placement equipment, including cutter component, drive mechanism that drives the cutter component to slide, and guide mechanism that provides slide room for the cutter component, the said guide mechanism comprises: cutter stop, base, cover plate arranged on the base, and cutting board arranged between the base and the cover plate; guide groove for accommodating cutter component slide is provided at the said base's contact side with the cutting board; the said cutter stop is arranged at the outer side of the guide groove to limit the cutter component from sliding out; the said cutting board has a protruding part relative to the base and the cover plate, a first tow guide hole is provided on the said protruding part; a second tow guide hole coaxial with the first guide hole is provided at the said cutter stop, a cutter avoidance groove is further provided at the said cutter stop's side close to the cutting board, and the second tow guide hole goes through the said cutter avoidance groove. The cutter device comes in robust and compact construction to guide the cutter to realize accurate movement.

11 Claims, 5 Drawing Sheets

(51) Int. Cl.
*B29C 70/54* (2006.01)
*B26D 7/00* (2006.01)
*B65H 35/00* (2006.01)

(52) U.S. Cl.
CPC .......... *B29C 70/545* (2013.01); *B26D 7/0006* (2013.01); *B29C 2793/00* (2013.01); *B65H 35/0086* (2013.01)

(56) References Cited

FOREIGN PATENT DOCUMENTS

| EP | 3192643 | 7/2017 | |
|---|---|---|---|
| WO | WO-2006060270 A1 * | 6/2006 | ........... B26D 7/2614 |

* cited by examiner

CUTTER DEVICE FOR AUTOMATED COMPOSITE MATERIAL PLACEMENT EQUIPMENT

CROSS-REFERENCE TO RELATED APPLICATION

This application claims the priority benefit of China patent application serial no. 201810819279.4, filed on Jul. 24, 2018. The entirety of the above-mentioned patent application is hereby incorporated by reference herein and made a part of the specification.

BACKGROUND OF THE INVENTION

Technical Field

This invention belongs to the technical field of automated composite material placement, and specifically relates to a cutter device for automated composite material placement equipment.

Related Art

Most aircraft composite materials in the early days adopted manual placement, which come in high labor intensity, high material waste, low productivity and non-guaranteed product quality. However, composite materials have advantages of high specific strength, high specific modulus, excellent anti-fatigue performance, low expansion coefficient and high designability etc., which are widely applied in the aviation field. In order to reduce manufacture cost and improve productivity, automated fiber placement machine emerges. Based on the layering design requirement of composite material members, carbon fiber prepreg tows are placed on the surface of the mold layer by layer, then the mold placed with the layers is put into the autoclave for curing.

Automated fiber placement machine allows for both convex side and concave side placement and placement of complex double curvature member. During the course of fiber placement, any fiber tow can be cut through or be transferred for use, tow cutting or adding can be executed strictly in accordance with requirements, so as to cut the placed layer to meet the boundary requirements of the member. Therefore, a tow cutting module needs to be designed, to comprise functions such as tow clamping function, tow cutting function and function of re-conveying the cut tow into the tow groove etc. Then the composite material is placed on the mold for heating up and pressing.

Automated fiber placement machine has been developing for decades overseas, and relevant technologies are highly matured. Tow cutting module is an important part of the automated fiber placement machine, relevant research on tow cutting module has also been conducted. Due to that the placement head of automated fiber placement machine is a mechanism with complex structure and multiple functions, and the tow cutting mechanism is an important module of the placement head, different placement head designs require different corresponding cutter structures. European patent EP 3192643 A1 discloses a blade structure based on automated fiber placement equipment, which is a two-way cutter, wherein controller commands actuator to lift or lower the blade to cut the tows. The fixing piece of the actuator is fixed to the attaching hole of the blade, and the blade is not provided with corresponding guide mechanism, therefore, cannot be accurately controlled, resulting in high deviation.

SUMMARY OF THE INVENTION

In consideration of the shortcomings of the prior art, a cutter device for automated composite material placement equipment is provided the cutter devices has a robust and compact construction and guides the cutter to realize accurate movement.

The technical solution provided by this invention is as follows:

A cutter device for automated composite material placement equipment, comprising cutter component, drive mechanism that drives the cutter component to slide, and guide mechanism that provides slide room for the cutter component, the said guide mechanism comprises: cutter stop, base, cover plate arranged on the base, and cutting board arranged between the base and the cover plate;

Guide groove for accommodating cutter component slide is provided at the side of the base in contact with the cutting board; the said cutter stop is arranged at the outer side of the guide groove for limiting the cutter component from sliding out; the said cutting board has a protruding part relative to the base and the cover plate, a first tow guide hole is provided on the said protruding part; a second tow guide hole coaxial with the first guide hole is provided at the said cutter stop, a cutter avoidance groove is further provided at the side of the cutter stop close to the cutting board, the second tow guide hole goes through the said cutter avoidance groove.

The drive mechanism of this invention drives the cutter component to move under the control of the control system, the cutter component slides in the guide groove along the cutting board towards the tow, when the cutter component reaches the cutter avoidance groove, it quickly cuts the tows in the first tow guide hole and second tow guide hole. Wherein the cutter stop can limit the cutter component to prevent the cutter component from sliding out of the guide groove, improving the safety and reliability of the cutter component. After the tow cutting is completed, the drive mechanism drives the cutter component to withdraw back to the original point. The guide mechanism of this invention is robust and compact, and guides the cutter component to realize accurate movement.

The number of cutter components in this invention is between 4 to 16, a corresponding number of guide grooves are provided on the said base; the said drive mechanisms come in the same number as the cutter components to drive the corresponding cutter components to slide; the said cutting board is provided with corresponding number of first tow guide holes; the said cutter stop is provided with corresponding number of second tow guide holes. The cutter components comprise a plurality of same components in parallel assembly, the number of which can be freely added or reduced based on the number of the tows to be placed, each piece of tow is to be cut by its respectively corresponding cutter component, and the movement of the cutter components are respectively controlled by their corresponding drive mechanisms, hence realizing the function of tow adding or reduction. Preferably, the number of cutter components is 8.

The said cutter component in this invention comprises cutter base and cutter arranged on the cutter base, the said cutter base drives the cutter to slide in the guide groove, the said cutter can enter the cutter avoidance groove to cut the tows. As improvement, the front end face of the said cutter is arranged in inclination angle preferably at 0.8°, allowing for easier cutting of tow.

In this invention, a compensating mechanism to force the cutter component against the cutting board is arranged at the bottom of the said guide groove. The compensating mechanism automatically compensates the cutter components, pushes the cutter components against the cutting board tightly, eliminating the gap between the cutter component and the cutting board. The compensating mechanism can automatically compensate the wear error due to relative slide movement, improving tow cutting precision.

The said compensating mechanism in this invention comprises kicker block and compression spring arranged against and between the kicker block and the base; the said kicker block is in contact with the cutter component.

Preferably, the said compensating mechanism comprises three compression springs which are sequentially arranged in the length direction of the kicker block.

Preferably, a first guide shaft is provided in the compression spring located at the two sides of the said kicker block, the said first guide shaft is arranged against and between the kicker block and the base; a second guide shaft is provided in the compression spring located in the middle of the said kicker block, one end of the said second guide shaft is fixed at the kicker block, the other end goes through the base and is provided with limit bolt. Through the mating of the limit bolt with the second guide shaft, the kicker block can be prevented from sliding out during disassembly.

The said drive mechanism in this invention comprises yoke, air piston arranged on the yoke and output shaft; the said output shaft is connected with the cutter component, the said yoke is arranged on the guide mechanism.

The said first tow guide hole in this invention is a rectangular through-hole, one side wall surface of the said rectangular through hole is inclined plane. A cut angle is formed between the inclined plane and the cutter to facilitate cutting.

The said second tow guide hole in this invention is a through-hole, a first funnel-shaped opening is provided at the top of the said through hole; a second funnel-shaped opening coaxial with the second tow guide hole is provided in the said cutter avoidance groove. The funnel-shaped opening ensures that after the tow is cut and is to be conveyed again, the tow can accurately enter the second tow guide hole.

Comparing to the prior art, the benefits of this invention are as follows:

(1) The guide mechanism of this invention comes in robust and compact construction to guide the cutter component to realize accurate movement.

(2) The cutter components in this invention comprise a plurality of same components in parallel assembly, the number of which can be freely added or reduced based on the number of the tows to be placed, each piece of tow is to be cut by its respectively corresponding cutter component, and the movement of the cutter components are respectively controlled by their corresponding drive mechanisms, hence realizing the function of tow adding or reduction.

(3) The compensating mechanism in this invention can automatically compensate the wear error due to relative slide movement, improving tow cutting precision.

Where, 1: Guide mechanism; 101: Base; 102: Cover plate; 103: Cutting board; 104: Cutter stop; 105: Guide groove; 106: Protruding part; 107: Cutter avoidance groove; 108: First tow guide hole; 109: Second tow guide hole; 110: Second funnel-shaped opening; 111: First funnel-shaped opening; 2: Cutter component; 201: Cutter; 202: Cutter base; 3: Drive mechanism; 301: Yoke; 302: Output shaft; 303: Air piston; 4: Compensating mechanism; 401: Kicker block; 402: Compression spring; 403: Second guide shaft; 404: First guide shaft; 405: Limit bolt; 5. Fiber tow.

DETAILED DESCRIPTION OF THE EMBODIMENTS

Below is further description of this invention in combination with specific embodiments and figures.

Figure 1:
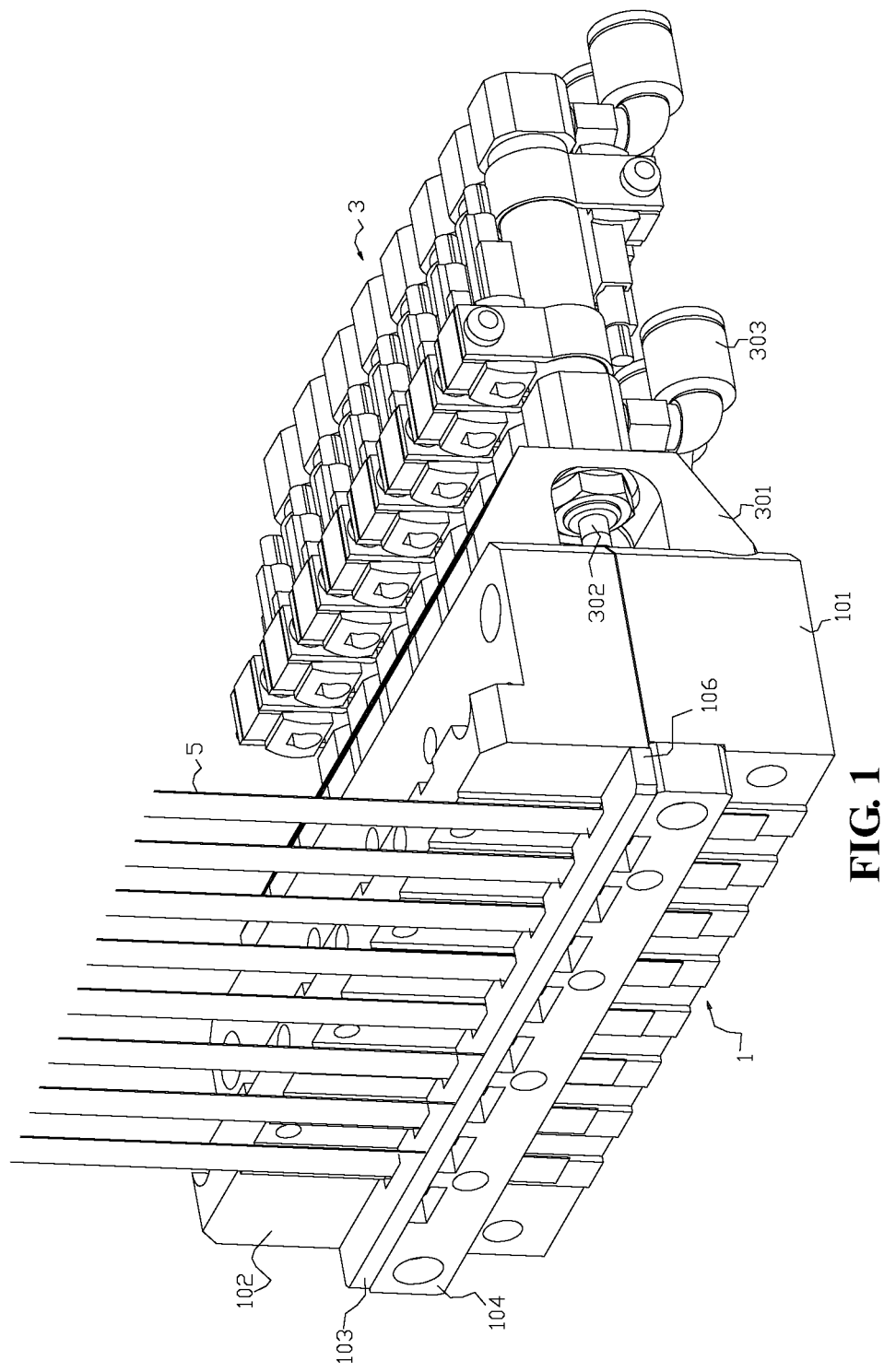
FIG. 1 is stereogram of the cutter device in the embodiment.
Figure 2:
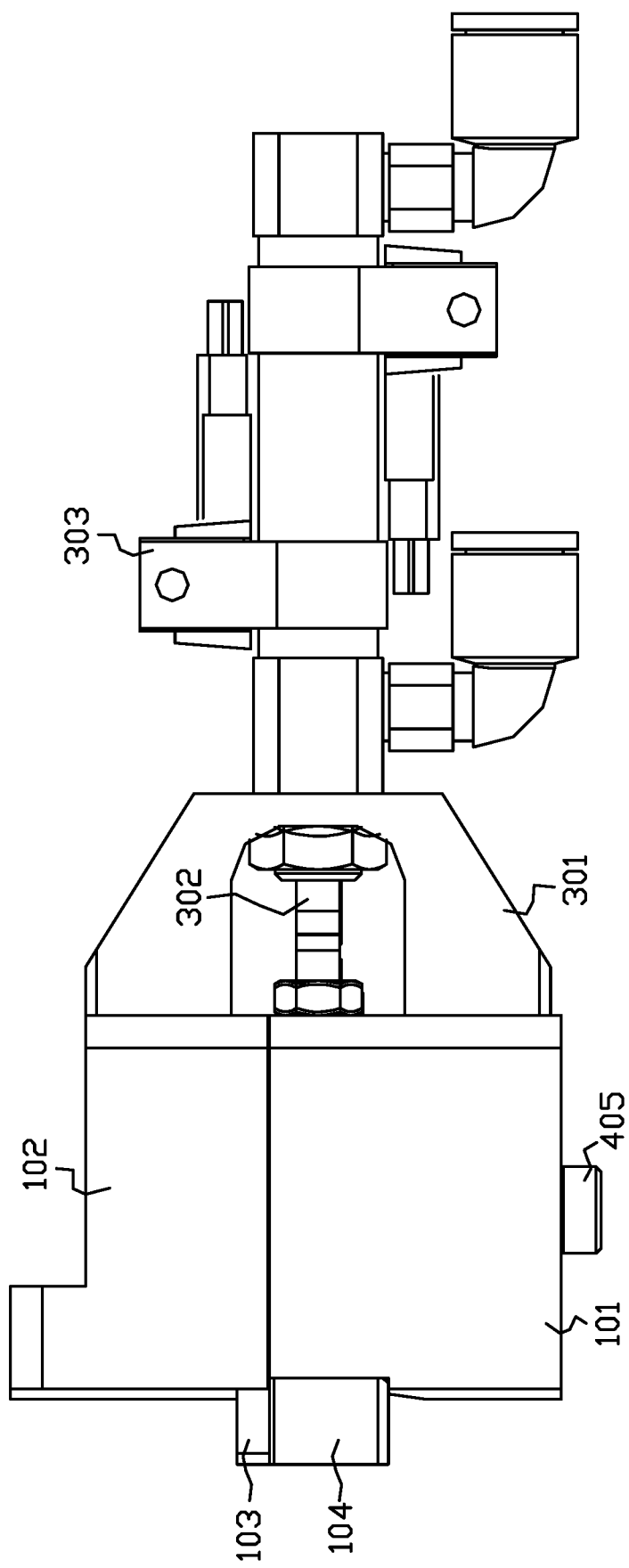
FIG. 2 is side view of the cutter device in the embodiment.
Figure 3:
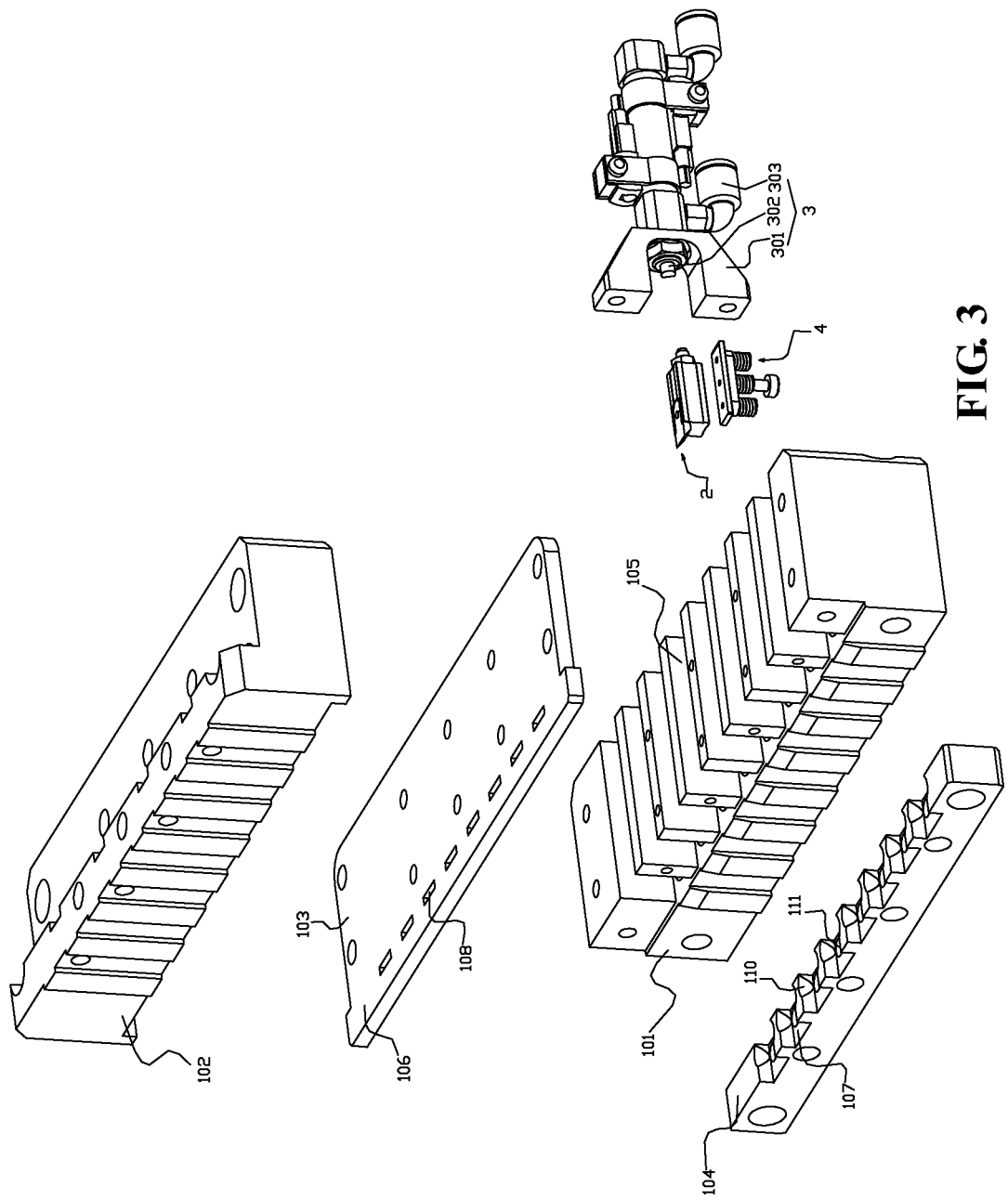
FIG. 3 is disassembly view of the cutter device in the embodiment.

As shown in FIG. 1-3, a cutter device for automated composite material placement includes: cutter component 2, drive mechanism 3, guide mechanism 1 and compensating mechanism 4. Where, there are totally eight cutter components 2, correspondingly, there are also eight drive mechanisms 3 and compensating mechanisms 4. Since the aforementioned eight cutter components 2, drive mechanisms 3 and compensating mechanisms 4 are respectively in the same constructions, FIG. 3 omits partially same constructions, and only gives illustration for one set of drive mechanisms 3, compensating mechanisms 4 and cutter components 2.

Figure 4:
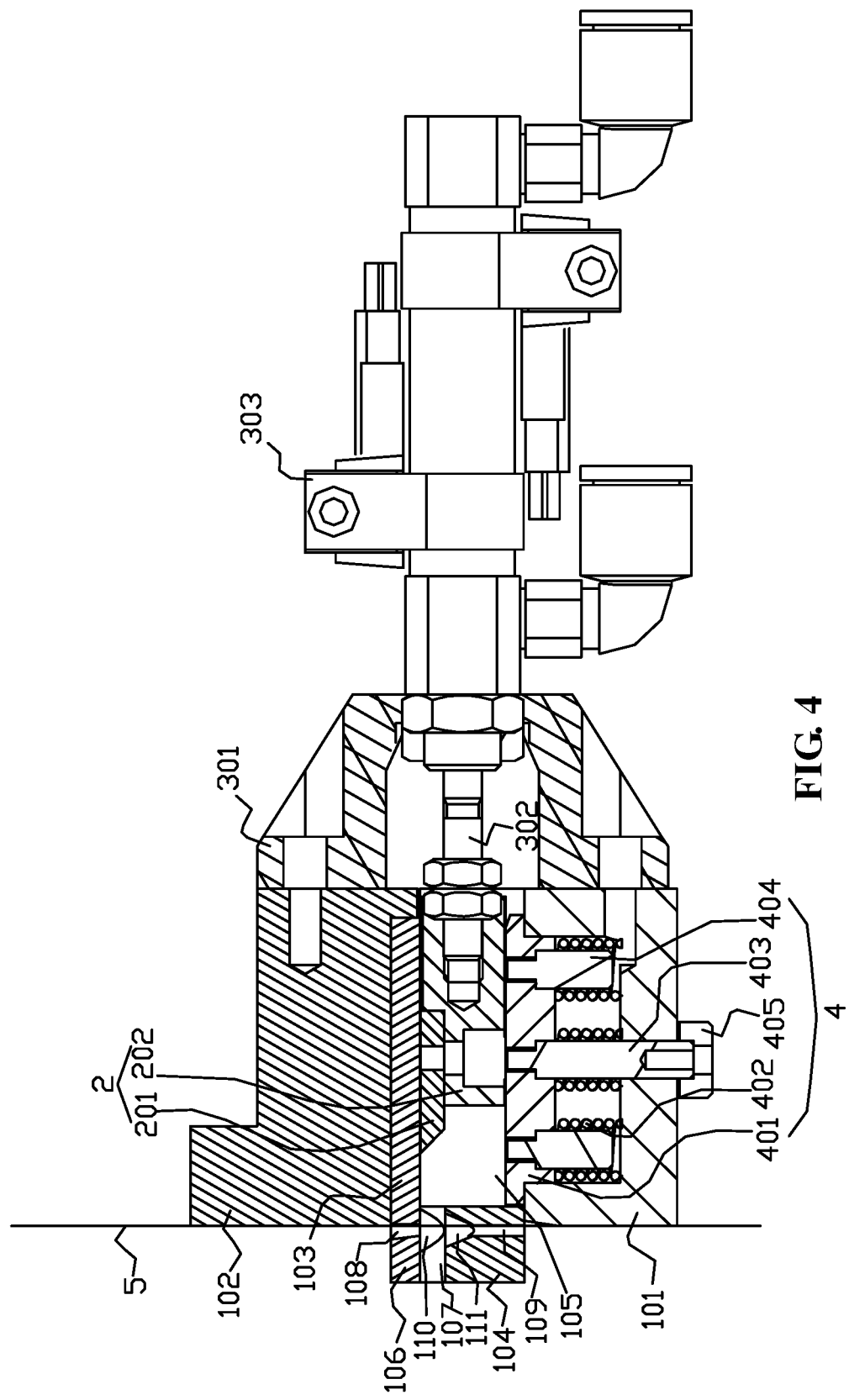
FIG. 4 is broken-out section view of the cutter device in non-cutting state in the embodiment.
Figure 5:
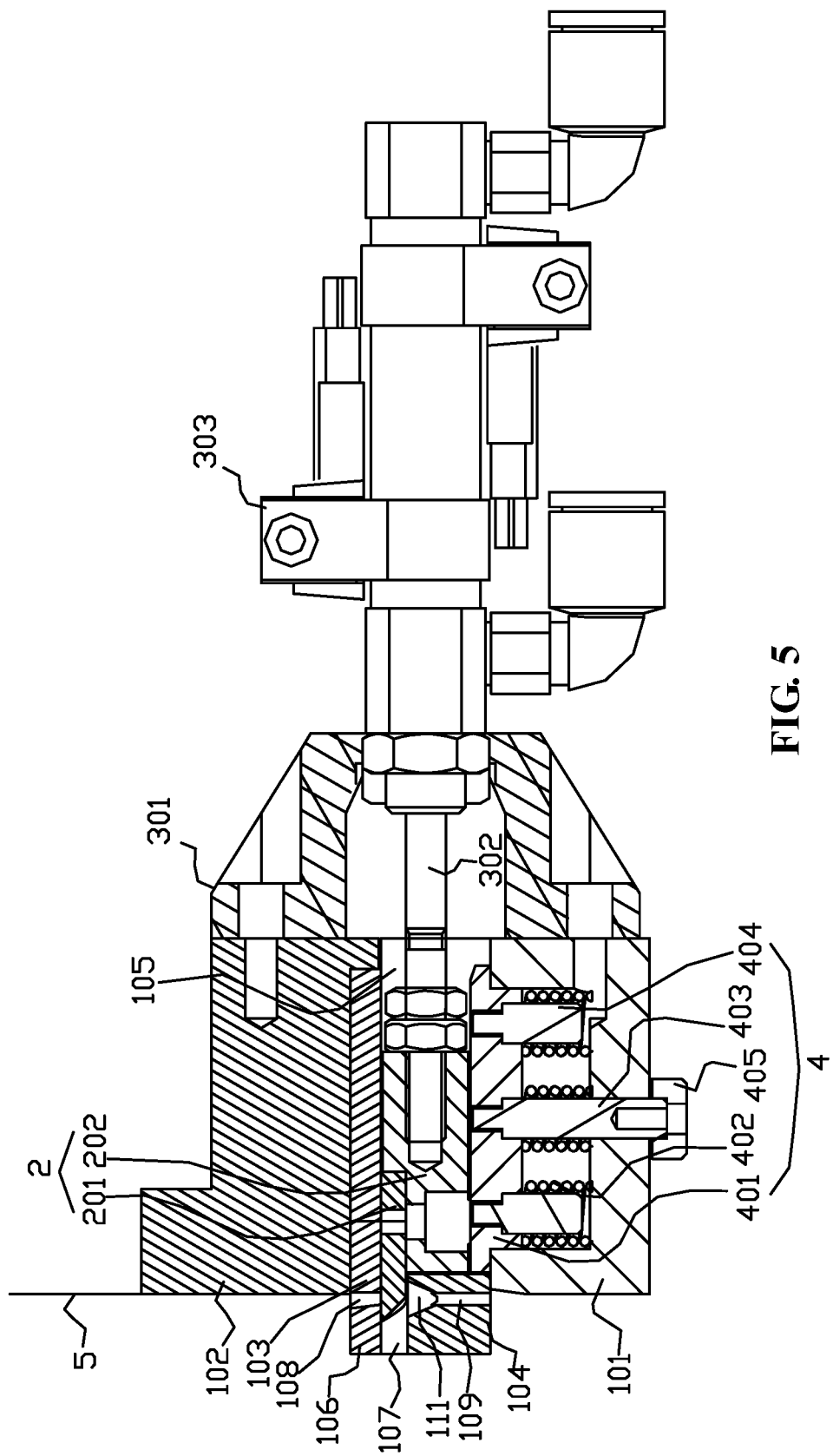
FIG. 5 is broken-out section view of the cutter device in cutting state in the embodiment.

As shown in FIG. 4-5, the guide mechanism 1 comprises: cutter stop 104, base 101, cover plate 102 fixed and mounted on the base 101, and cutting board 103 arranged between the base 101 and the cover plate 102. Guide groove 105 for accommodating the slide of cutter component 2 is provided at the contact side of base 101 and cutting board 106, there are a total of eight guide grooves 105 in parallel arrangement, respectively for installing eight cutter components 2. Cutter stop 104 is arranged at the outer side of guide groove 105 for limiting cutter component 2 from sliding out.

Cutting board 103 has a protruding part 106 relative to base 101 and cover plate 102, eight first tow guide holes 108 corresponding to cutter components 2 are arranged on the protruding part 106. First tow guide hole 108 is a rectangular through hole, one side wall surface of the rectangular through hole is an inclined plane, and a cutting angle is formed between the inclined plane and cutter 201 to facilitate cutting. Eight second tow guide holes 109 coaxial with first tow guide hole 108 are also arranged on cutter stop 104. Second tow guide hole 109 is a through hole, and first funnel-shaped opening 111 is provided at the top of the through hole. A cutter avoidance groove 107 is further provided at the side of cutter stop 104 close to cutting board 103, and the second tow guide hole 109 goes through the cutter avoidance groove 107. Fiber tow 5 respectively goes through first tow guide hole 108, cutter avoidance groove 107 and second tow guide hole 109. A second funnel-shaped opening 110 coaxial with the second tow guide hole 109 is provided in the cutter avoidance groove 107. The funnel-shaped opening ensures that after the fiber tow 5 is cut and is to be conveyed again, the tow 5 can accurately enter the second tow guide hole 109.

Cutter component 2 comprises cutter base 202 and cutter 201 arranged on cutter base 202. The front end face of the cutter 201 is arranged in inclination angle specifically at 0.8°, allowing for easier cutting of tow 5. Cutter 201 is arranged tightly against cutting board 103. Cutter base 202 drives cutter 201 to slide along cutting board 103 in guide groove 105, cutter 201 can enter cutter avoidance groove 107 to cut tow 5.

Eight compensating mechanisms 4 are respectively and correspondingly arranged at the bottom of the eight guide groove 105 to force the cutter components 2 against cutting board 103. The compensating mechanism 4 automatically compensates the cutter components 2, and pushes the cutter components 2 against the cutting board 103 tightly, eliminating the gap between the cutter component 2 and the cutting board 103. The compensating mechanism 4 can automatically compensate the wear error due to relative slide movement, improving tow cutting precision.

The compensating mechanism 4 comprises kicker block 401, compression spring 402, first guide shaft 404 and second guide shaft 403. The contact surface between kicker block 401 and cutter base 202 is a flat plane, avoiding causing resistance to sliding between them. Three compression springs 402 are respectively arranged in each set of compensating mechanism, and compression spring 402 is abutted between kicker block 401 and base 101. Three compression springs 402 are sequentially arranged in the length direction of the kicker block 401. First guide shaft 404 is provided in the compression springs 402 at the two sides of kicker block 401, and the first guide shaft 404 is abutted between kicker block 401 and base 101. Second guide shaft 403 is provided in the compression spring 402 at the middle of kicker block 401, one end of second guide shaft 403 is fixed at kicker block 401, the other end goes through base 101 and is provided with limit bolt 405, with the mating effect of limit bolt 405 and second guide shaft 403, kicker block 401 can be prevented from sliding out when disassembling.

Drive mechanism comprises yoke 301, air piston 303 arranged on yoke 301 and output shaft 302 of air piston 303, the output shaft 302 of air piston 303 is in fixed connection with cutter base 202, yoke 301 is arranged on guide mechanism 1, and the two ends of yoke 301 are respectively fixed and arranged on base 101 and cover plate 102.

The working process is as follows:

As shown in FIG. 4, the cutter device starts working as the automated placement device starts up, fiber tow 5 sequentially goes through first tow guide hole 108, cutter avoidance groove 107 and second tow guide hole 109, and are conveyed downward and laid and folded onto the mold, and fiber tow 5 is in tensioned state. At that time, cutter component 2 is in initial state, cutter 201 is in guide groove 105, and has not entered the cutter avoidance groove 107 yet.

As shown in FIG. 5, the control system in the automated placement device gives tow-cutting command, air piston 303 provides the force to drive output shaft 302, output shaft 302 pushes cutter base 202 to move quickly forward for a distance, cutter 201 moves forward quickly along with the cutter base 202, and cutter 201 reaches cutter avoidance groove 107 to quickly cut target fiber tow 5.

After the cutting is completed, air piston 303 drives cutter component 2 back to initial state, and repeats tow cutting process according to the command of the control system until the composite material processing is completed.

What is claimed is:

1. A cutter device for automated composite material placement equipment, comprising at least one cutter component, at least one drive mechanism that drives the at least one cutter component to slide, and a guide mechanism that provides slide room for the at least one cutter component, wherein the guide mechanism comprises: a cutter stop, a base, a cover plate arranged on the base, and a cutting board arranged between the base and the cover plate;

at least one guide groove for accommodating the cutter component to slide is provided in a side of the base in contact with the cutting board; the cutter stop is arranged at an outer side of the at least one guide groove to limit the at least one cutter component from sliding out; the cutting board has a protruding part relative to the base and the cover plate, and a first tow guide hole is provided on the protruding part; a second tow guide hole coaxial with the first tow guide hole is provided on the cutter stop, and a cutter avoidance groove is further provided at a side of the cutter stop close to the cutting board, the second tow guide hole extends through the cutter avoidance groove.

2. A cutter device for automated composite material placement equipment according to claim 1, wherein a number of the at least one cutter component is between 4 to 16, a corresponding number of guide grooves are provided on the base; the at least one drive mechanism corresponds to the number of cutter components; the cutting board is provided with a corresponding number of the first tow guide hole; the cutter stop is provided with a corresponding number of the second tow guide hole.

3. A cutter device for automated composite material placement equipment according to claim 2, wherein a compensating mechanism to force the at least one cutter component against the cutting board is arranged at the bottom of the at least one guide groove.

4. A cutter device for automated composite material placement equipment according to claim 1, wherein the at least one cutter component comprises a cutter base and a cutter arranged on the cutter base, the cutter base drives the cutter to slide in the at least one guide groove, the cutter can enter the cutter avoidance groove to cut the tows.

5. A cutter device for automated composite material placement equipment according to claim 1, wherein a compensating mechanism to force the at least one cutter component against the cutting board is arranged at the bottom of the at least one guide groove.

6. A cutter device for automated composite material placement equipment according to claim 5, wherein the compensating mechanism comprises a kicker block and a compression spring arranged against and between the kicker block and the base; the kicker block is in contact with the at least one cutter component.

7. A cutter device for automated composite material placement equipment according to claim 6, wherein the compensating mechanism comprises three compression springs which are sequentially arranged in a length direction of the kicker block.

8. A cutter device for automated composite material placement equipment according to claim 7, wherein a first guide shaft is provided in the compression springs located at a first side and a second side of the kicker block, the first guide shaft is arranged against and between the kicker block and the base;

a second guide shaft is provided in the compression spring located in a middle of the kicker block, one end of the second guide shaft is fixed at the kicker block, the other end penetrates through the base and is provided with limit bolt.

9. A cutter device for automated composite material placement equipment according to claim 1, wherein the at least one drive mechanism comprises a yoke, an air piston arranged on the yoke and an output shaft; the output shaft is connected with the at least one cutter component, the yoke is arranged on the guide mechanism.

10. A cutter device for automated composite material placement equipment according to claim 1, wherein the first tow guide hole is a rectangular through-hole, and at least one side wall surface of the rectangular through hole is inclined.

11. A cutter device for automated composite material placement equipment according to claim 1, wherein the second tow guide hole is a through-hole, a first funnel-shaped opening is provided at a top of the through hole; a second funnel-shaped opening coaxial with the second tow guide hole is provided in the cutter avoidance groove.

\* \* \* \* \*